UNITED STATES PATENT OFFICE.

CLARENCE DELAFIELD, OF FACTORYVILLE, NEW YORK.

IMPROVEMENT IN THE MANUFACTURE OF WHITE LEAD.

Specification forming part of Letters Patent No. 53,583, dated April 3, 1866.

*To all whom it may concern:*

Be it known that I, CLARENCE DELAFIELD, of Factoryville, county of Richmond, and State of New York, have invented certain new and useful Improvements in the Art of Manufacturing White Lead; and I do hereby declare the following to be a full, clear, and exact description of the manner of practicing my said invention.

In the practice of my invention for which Letters Patent of the United States were granted to me on the 23d day of January, 1866, I find it more economical to make my solution of nitrate of lead by uniting the oxide of lead with the diluted nitric acid, instead of dissolving the metallic lead therein, as proposed in said patent; and practice has also shown the expediency, if not the necessity, of varying the proportions stated in said patent in making my solution of carbonate of potash, as hereinafter stated.

To make my solution of the nitrate of lead out of the oxide of lead, as above stated, I take one hundred and twenty-four parts of nitric acid—that is, the acid of commerce—at about 36° Baumé. To this I add one hundred and twelve parts of oxide of lead and sufficient water to make a saturated solution of the nitrate of lead when formed. The solution of the carbonate of potash I now make to consist of about ninety parts of the carbonate of potash dissolved in its weight of water, and in order to convert the mixture of the nitric acid and oxide of lead quickly into a solution of nitrate of lead, it is necessary to make the mixture hot; and in order to get the best results which the two solutions are capable of yielding when united, it is necessary to make them both hot before uniting them. I therefore mix the oxide of lead and nitric acid in hot water, and raise the temperature of the mixture to about 190° Fahrenheit, and the carbonate-of-potash solution I make by dissolving the potash in boiling water and raise the temperature to about 180° Fahrenheit. These solutions being thus made and heated, I throw the hot solution of the carbonate of potash into the hot solution of the nitrate of lead, by which I at once precipitate the carbonate of lead and leave the nitrate of potash in solution, while, at the same time, I prevent the precipitated carbonate of lead from crystallizing, and get also a small proportion of the hydrated oxide of lead in combination with the carbonate of lead, thus obtaining a result which is identical in specific gravity, opacity, and granular formation with that obtained by what is known as the "Dutch" method of manufacturing white lead, while, at the same time, I avoid the impurities incidental to that method; and by thus making and heating these solutions I get a rapid crystillization of the saltpeter of commerce which results as a residue of the process.

Having now described my improvements in the art of manufacturing white lead, I claim and desire to secure by Letters Patent—

1. Uniting or combining a solution of the nitrate of lead, or its equivalent, for this purpose, made substantially as described, with a solution of the carbonate of potash, or its equivalent, for this purpose, made substantially as described, for the purpose of producing the white lead of commerce.

2. Uniting or combining a hot solution of the carbonate of potash, or its equivalent, for this purpose, with a hot solution of the nitrate of lead, or its equivalent, for this purpose, without regard to the proportions in which the two solutions are made, for the purpose of producing the white lead of commerce.

CLARENCE DELAFIELD.

Witnesses:
AMOS BROADNAX,
PETER D. KENNY.